(12) United States Patent
Nam et al.

(10) Patent No.: US 11,510,274 B2
(45) Date of Patent: Nov. 22, 2022

(54) PROACTIVE WAKE-UP BEAM MANAGEMENT FOR CONNECTED MODE DISCONTINUOUS RECEPTION (C-DRX) OPERATION

(71) Applicant: QUALCOMM Incorporated, San Diego, CA (US)

(72) Inventors: Wooseok Nam, San Diego, CA (US); Tao Luo, San Diego, CA (US); Juan Montojo, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/522,013

(22) Filed: Jul. 25, 2019

(65) Prior Publication Data

US 2020/0037388 A1    Jan. 30, 2020

Related U.S. Application Data

(60) Provisional application No. 62/711,186, filed on Jul. 27, 2018.

(51) Int. Cl.
*H04W 76/28* (2018.01)
*H04W 16/28* (2009.01)
*H04W 84/04* (2009.01)

(52) U.S. Cl.
CPC ........... *H04W 76/28* (2018.02); *H04W 16/28* (2013.01); *H04W 84/042* (2013.01)

(58) Field of Classification Search
CPC .................................................... H04W 76/28
See application file for complete search history.

(56) References Cited

U.S. PATENT DOCUMENTS

| | | | |
|---|---|---|---|
| 2016/0128128 A1* | 5/2016 | Ang | H04W 76/28 370/311 |
| 2019/0037498 A1* | 1/2019 | Tseng | H04W 52/0219 |
| 2019/0053321 A1* | 2/2019 | Islam | H04B 7/0639 |

(Continued)

OTHER PUBLICATIONS

International Search Report and Written Opinion—PCT/US2019/043730—ISA/EPO—dated Sep. 19, 2019.

(Continued)

*Primary Examiner* — Ivan O Latorre
*Assistant Examiner* — Won Tae C Kim
(74) *Attorney, Agent, or Firm* — Heejong Yoo

(57) ABSTRACT

The present disclosure provides for proactive wake-up beam management for connected mode discontinuous reception (C-DRX) operation. For example, a user equipment (UE) monitor one or more synchronization signal blocks (SSBs) or reference signals received associated with a set of wake-up beams from a network entity. The UE may further determine that the set of wake-up beams satisfies a distress condition. The UE may additionally transmit a distress indication to the network entity based on determining that the set of wake-up beams satisfies the distress condition. Aspects described herein also provide a network entity that receives a distress indication from the UE in response to transmitting a set of wake-up beams and transmits a subsequent set of wake-up beams having at least one wake-up beam different not included in the set of wake-up beams to the UE.

22 Claims, 7 Drawing Sheets

(56) References Cited

U.S. PATENT DOCUMENTS

| | | | |
|---|---|---|---|
| 2019/0215888 A1* | 7/2019 | Cirik | H04B 7/0695 |
| 2020/0029302 A1* | 1/2020 | Cox | H04W 56/0015 |
| 2020/0083946 A1* | 3/2020 | You | H04W 76/19 |
| 2020/0205219 A1* | 6/2020 | Chen | H04W 76/19 |

OTHER PUBLICATIONS

Qualcomm Incorporated: Beam Management in C-DRX, 3GPP Draft; R2-1803030—Beam Management in C-DRX, 3rd Generation Partnership Project (3GPP), Mobile Competence Centre, 650, Route Des Lucioles, F-06921 Sophia-Antipolis Cedex, France vol. RAN WG2, No. Athens, Greece; Feb. 26, 2018-Mar. 2, 2018 Feb. 15, 2018, XP051399648, Retrieved from the Internet:URL:http://www.3gpp.org/ftp/tsg%5Fran/WG2%5FRL2/TSGR2%5F101/Docs/ [retrieved on Feb. 15, 2018], 3 pages.

Qualcomm: "Wakeup Signaling for Multi-beam Systems," 3GPP Draft; R2-1713803 Wakeup Signaling for Multi-Beam Systems, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, XP051372458, 4 Pages, Retrieved from the Internet: URL: http://www.3gpp.org/ftp/tsg%5Fran/WG2%5FRL2/TSGR2%5F100/Docs/ [retrieved on Nov. 17, 2017] the whole document.

* cited by examiner

PROACTIVE WAKE-UP BEAM MANAGEMENT FOR CONNECTED MODE DISCONTINUOUS RECEPTION (C-DRX) OPERATION

CROSS-REFERENCE TO RELATED APPLICATION(S)

This application claims the benefit of U.S. Provisional Application Ser. No. 62/711,186, entitled "PROACTIVE WAKE-UP BEAM MANAGEMENT FOR CONNECTED MODE DISCONTINUOUS RECEPTION (C-DRX) OPERATION" and filed on Jul. 27, 2018, which is expressly incorporated by reference herein in its entirety.

BACKGROUND

Aspects of the present disclosure relate generally to wireless communication networks, and more particularly, to proactive wake-up beam management for connected mode discontinuous reception (C-DRX) operation.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for various communications technology such as, but not limited to LTE and NR, proactively managing wake-up beams may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a user equipment (UE). The method may include monitoring one or more synchronization signal blocks (SSBs) or reference signals associated with a set of wake-up beams from a network entity. The method may further include determining that the set of wake-up beams satisfies a distress condition. Additionally, the method may include transmitting a distress indication to the network entity based on determining that the set of wake-up beams satisfies the distress condition.

In a further aspect, the present disclosure includes a UE for wireless communications comprising a memory including one or more instructions and at least one processor in communication with the memory configured to execute the one or more instructions. The at least one processor may be configured to monitor one or more synchronization signal blocks (SSBs) or reference signals associated with a set of wake-up beams from a network entity. The at least one processor may further be configured to determine that the set of wake-up beams satisfies a distress condition. The at least one processor may further be configured to transmit a distress indication to the network entity based on determining that the set of wake-up beams satisfies the distress condition.

In an additional aspect, the present disclosure includes a UE for wireless communications. The UE may include means for monitoring one or more synchronization signal blocks (SSBs) or reference signals associated with a set of wake-up beams from a network entity. The UE may further include means for determining that the set of wake-up beams satisfies a distress condition. Additionally, the UE may include means for transmitting a distress indication to the network entity based on determining that the set of wake-up beams satisfies the distress condition.

In yet another aspect, the present disclosure includes a non-transitory computer-readable medium storing computer code executable by a processor for wireless communications at a UE. The computer-readable medium may include code for monitoring one or more synchronization signal blocks (SSBs) or reference signals associated with a set of wake-up beams from a network entity. The computer-readable medium may further include code for determining that the set of wake-up beams satisfies a distress condition. The computer-readable medium may further include code for transmitting a distress indication to the network entity based on determining that the set of wake-up beams satisfies the distress condition.

In an aspect, the present disclosure includes a method for wireless communications at a network entity. The method may include transmitting a set of wake-up beams associated with one or more SSBs or reference signals to a UE. The method may further include receiving a distress indication from the UE in response to transmitting the set of wake-up beams. Additionally, the method may include transmitting a subsequent set of wake-up beams having at least one wake-up beam not included in the set of wake-up beams to the UE.

In a further aspect, the present disclosure includes a network entity for wireless communications comprising a memory including one or more instructions and at least one processor in communication with the memory configured to execute the one or more instructions. The at least one processor may be configured to transmit a set of wake-up beams associated with one or more SSBs or reference signals to a UE. The at least one processor may further be configured to receive a distress indication from the UE in response to transmitting the set of wake-up beams. The at least one processor may further be configured to transmit a subsequent set of wake-up beams having at least one wake-up beam not included in the set of wake-up beams to the UE.

In an additional aspect, the present disclosure includes a network entity for wireless communications. The network entity may include means for transmitting a set of wake-up beams associated with one or more SSBs or reference signals to a UE. The network entity may further include means for receiving a distress indication from the UE in response to transmitting the set of wake-up beams. The network entity may further include means for transmitting a subsequent set of wake-up beams having at least one wake-up beam not included in the set of wake-up beams to the UE.

In yet another aspect, the present disclosure includes a non-transitory computer-readable medium storing computer code executable by a processor for wireless communications at a network entity comprising code for transmitting a set of wake-up beams associated with one or more SSBs or reference signals to a UE. The computer-readable medium may further include code for receiving a distress indication from the UE in response to transmitting the set of wake-up beams. The computer-readable medium may additionally include code for transmitting a subsequent set of wake-up beams having at least one wake-up beam not included in the set of wake-up beams to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
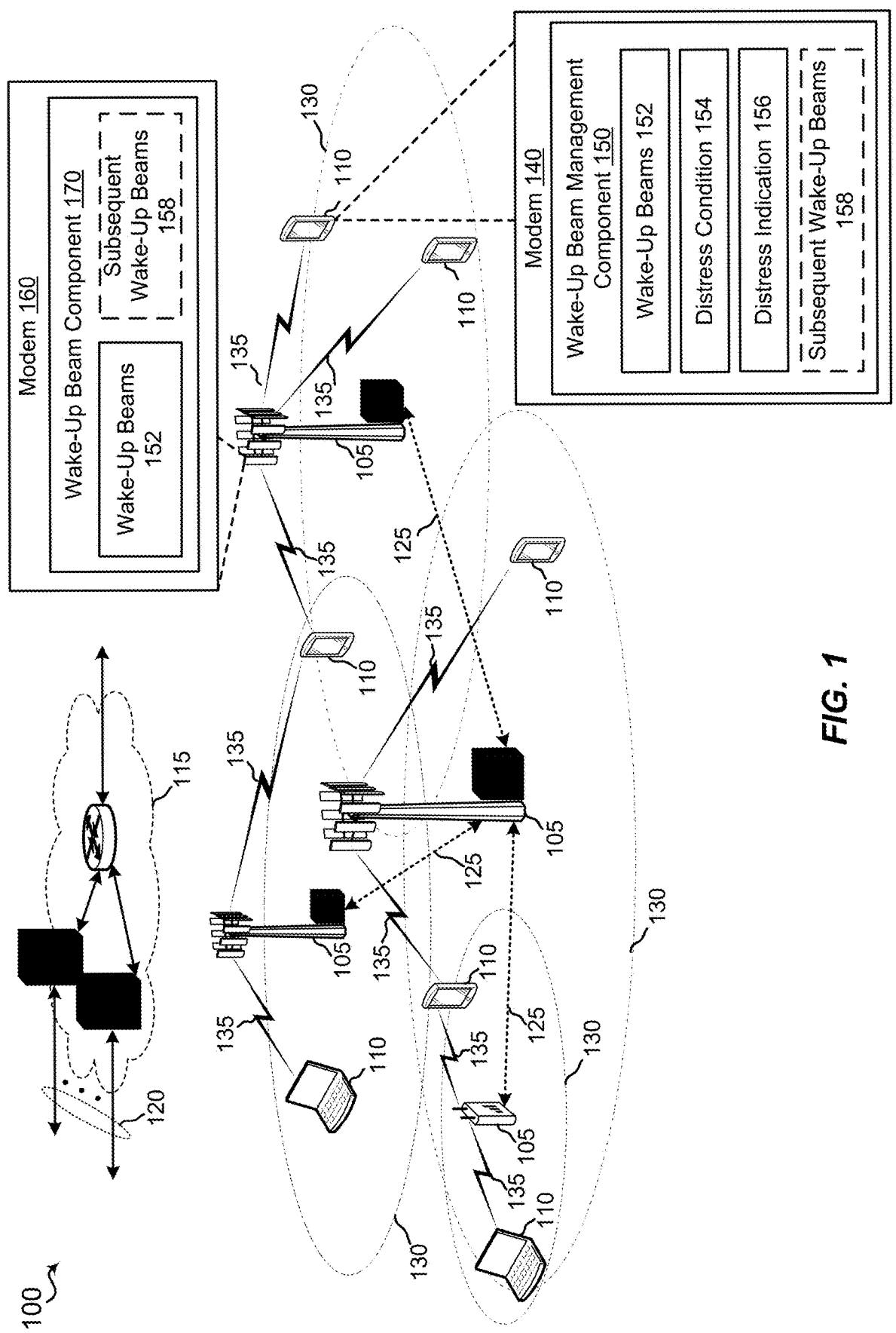
FIG. 1 is an example schematic diagram of an example of a wireless communication network including at least one base station having an wake-up beam component and at least one user equipment (UE) having a wake-up beam management component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to proactive wake-up beam management for connected mode discontinuous reception (C-DRX) operation. For example, in some wireless communication networks employing certain radio access technologies (e.g., 5G/new radio (NR)), a UE may enter a C-DRX OFF state to improve power consumption. During the C-DRX OFF state, a network entity (e.g., a base station such as a gNB) may transmit a wake-up signal or indication to a UE to trigger the UE to transition from the C-DRX OFF state to a C-DRX ON state. Specifically, the network entity may transmit a set of wake-up beams to the UE. However, in some aspects such as long DRX cycles or high UE mobility scenarios, beam degradation may occur, resulting in a failure by the UE to receive and/or detect at least a portion of the set of wake-up beams from the network entity. When a beam failure occurs, the UE may report the failure immediately to the network entity, and request a new set of beams by initiating a beam-failure recovery procedure. The beam-failure recovery procedure may involve transmission of a beam failure recovery request from the UE to the network entity, receiving a response from the network entity, and receiving a new beam configuration (radio resource connection (RRC)) from the network entity. However, the forgoing procedure introduces a long latency. Thus, it may be desirable to proactively manage the wake-up beams at the UE and/or network entity during C-DRX operation.

As such, in an aspect, the present aspects provide a UE that monitors one or more SSBs or reference signals received associated with a set of wake-up beams from a network entity. The UE may further determine that the set of wake-up beams satisfies a distress condition. Additionally, the UE transmits a distress indication to the network entity based on determining that the set of wake-up beams satisfies the distress condition.

The present aspects also provide a network entity that transmits a set of wake-up beams associated with one or more SSBs or reference signals to a UE. The network entity may further receive a distress indication from the UE in response to transmitting the set of wake-up beams. The network entity may additionally transmit a subsequent set of wake-up beams having at least one wake-up beam different not included in the set of wake-up beams to the UE.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one base station 105 in communication with a UE 110. The wireless communications network 100 (also referred to as a wireless wide area network (WWAN)) includes base stations 105, UEs 1110, an Evolved Packet Core (EPC) 160, and a 5G Core (5GC) 190. The base stations 105 may include macro cells (high power cellular base station) and/or small cells (low power cellular base station). The macro cells include base stations. The small cells include femtocells, picocells, and microcells.

The UE 110 may include a wake-up beam management component 150 configured to proactively manage a set of wake-up beams 152 and/or any subsequent wake-up beams 158 received from the base station 105 to reduce the latency between potential beam failures from a current set of wake-up beams (e.g., wake-up beams 152) and a subsequent set of wake-up beams 158.

Specifically, the wake-up beam management component 150 may be configured to monitor periodic SSBs and/or channel state information reference signals (CSI-RS) for or associated with a set of wake-up beams 152 from the base station 105. During the monitoring, the wake-up beam management component 150 may detect or otherwise determine that a number of wake-up beams from the set of wake-up beams 152 fall below a quality threshold such that communication of the wake-up indication may fail on the resources associated with the corresponding wake-up beam. For example, the set of wake-up beams 152 may include four wake-up beams each associated with at least one uplink resource. During the C-DRX OFF state or period, the wake-up beam management component 150 may determine that a number of wake-up beams (e.g., two wake-up beams) forming the set of wake-up beams 152 fall below a quality threshold based on, for instance, a reference signal receive power (RSRP) of the wake-up beams failing to satisfy the quality threshold. Such failure may trigger a distress condition 154 at the UE 110, whereby the wake-up beam management component 150 may transmit, at a subsequent C-DRX ON duration, a distress indication 156 to the base station 105 to inform the base station 105 of the failed wake-beams from the set of wake-up beams 152. The distress indication 156 may identify the failed wake-up beams from the set of wake-up beams 152 and/or trigger the base station 105 to transmit a subsequent set of wake-up beams 158 not including or omitting the failed wake-up beams from the set of wake-up beams 152.

The base station 105 may have a modem 160 including a wake-up beam component 170 configured to transmit one or more sets of wake-up beams based on the qualitative state of the wake-beams as identified by the UE 110. That is, the wake-up beam component 170 may adjust a composition of the set of wake-up beams 152 based on the distress indication 156 received from the UE 105 that identifies one or more wake-up beams in the set of wake-up beams 152 that fail to satisfy the quality threshold. The wake-up beam component 170 may then transmit or provide the subsequent wake-up beams 158 to the UE 110 which do not include the failed wake-up beams from the set of wake-up beams 152.

The wireless communication network 100 may include one or more base stations 105, one or more UEs 110, and a core network 115 (e.g., evolved packet core (EPC) and/or a 5GC). The base stations 105 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 105 configured for 5G NR (collectively referred to as Next Generation RAN (NG-RAN)) may interface with 5GC 190 through backhaul links 184. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 105 may wirelessly communicate with the UEs 110. Each of the base stations 105 may provide communication coverage for a respective geographic coverage area 110. There may be overlapping geographic coverage areas 130. For example, the small cell 105' may have a coverage area 130' that overlaps the coverage area 110 of one or more macro base stations 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 125 between the base stations 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 125 may use multiple-input and multiple-output (MIMO) antenna technology, including spatial multiplexing, beamforming, and/or transmit diversity. The communication links may be through one or more carriers. The base stations 105/UEs 110 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 105 may communicate with each other using device-to-device (D2D) communication link 198. The D2D communication link 198 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The small cell 105' may operate in a licensed and/or an unlicensed frequency spectrum. When operating in an unlicensed frequency spectrum, the small cell 105' may employ NR and use the same 5 GHz unlicensed frequency spectrum as used by a Wi-Fi access point. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station may utilize beamforming with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2A:
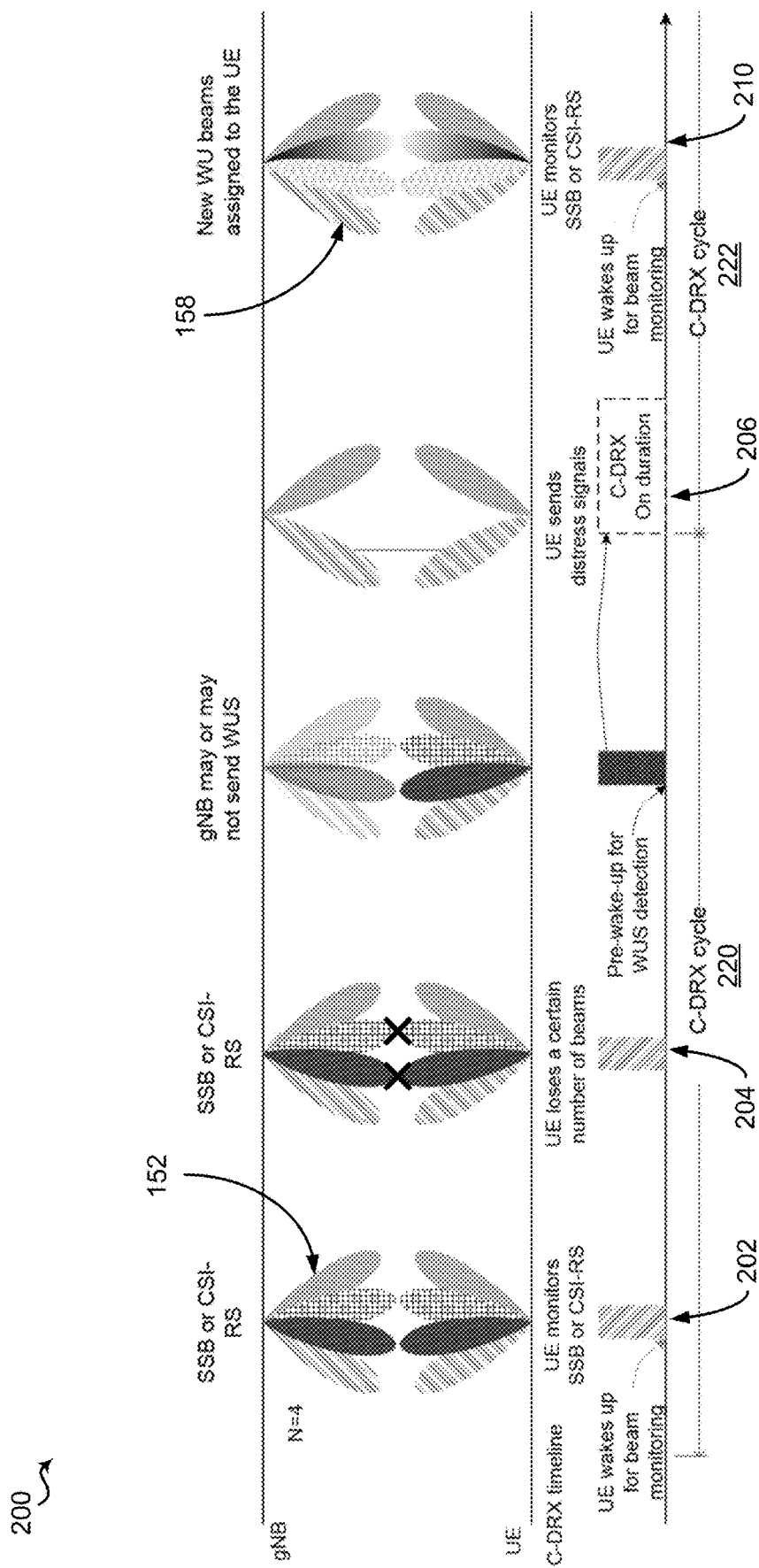
FIG. 2A is an example conceptual diagram of proactive wake-up beam management for connected mode discontinuous reception (C-DRX) operation.

FIG. 2A is a conceptual diagram of a C-DRX timeline 200 illustrating proactive wake-up beam management. Specifically, at 202, during a C-DRX OFF period of C-DRX cycle 220, a UE such as UE 110 may wake up and monitor periodic SSBs or CSI-RSs quasi-co-located (QCLed) with a configured N number of wake-up beams (e.g., N=4) forming the set of wake-up beams 152. For instance, the UE 110 may monitor a quality of the wake-up beams of the set of wake-up beams 152 by measuring the RSRP of each and comparing them with a corresponding threshold (e.g., quality threshold). In some aspects, the UE 110 may also perform reception beam refinement concurrently. At 204, the UE 110 may detect a distress condition 154 such that less than K (e.g., may be configurable, 0<K<N) beams have characteristics (e.g., RSRP) above a quality threshold. In some aspects, a timer or counter may be used to detect the distress condition 154. Specifically, in one aspect, if a wake-up beam quality of any one of the wake-up beams of the set of wake-up beams 152 falls below the quality threshold a number of consecutive times, the wake-up beam may be considered lost and identified as a failed beam. Further, if a wake-up beam quality of any one of the wake-up beams of the set of wake-up beams 152 falls below a threshold number of times within a configured time period, the wake-up beam may be considered lost and identified as a failed beam. Additionally, if less than K wake-up beams are considered valid or of sufficient quality (e.g., more than N−K beams are lost), a distress condition 154 may be declared. However, in some aspects, a radio link failure may also occur. For example, if all N wake-up beams are lost before the UE 110 transmits at least one distress indication 156, the UE 110 may declare a radio link failure and initiate an initial access procedure to establish a connection again.

At 206, as a result of detecting the distress condition 154, the UE 110 may send a distress indication 156 to the base station 105 at the next C-DRX ON duration of C-DRX cycle 222. In some aspects, when the distress condition 154 is detected, the UE 110 may wake up for a next C-DRX ON duration of the C-DRX cycle 222 to send the distress indication 156, regardless of a presence of the wake-up signal. If the UE 110 receives the wake-up signal after detecting the distress condition 154, the UE 110 may wake up for the next C-DRX ON duration, send the distress indication 156, perform the beam recovery procedure, and remain on during the rest of the C-DRX ON duration. In some aspects, if the UE 110 does not receive the wake-up signal after detecting the distress condition 154, the UE 110 may go back to sleep after the beam recovery process is completed. Upon receiving the distress indication 156, the base station 105 may perform a partial beam recovery procedure. Upon completing the beam recovery procedure, at 208, a new set of wake-up beams may be assigned to the UE 110 and utilized for the next C-DRX cycle 222.

Figure 2B:
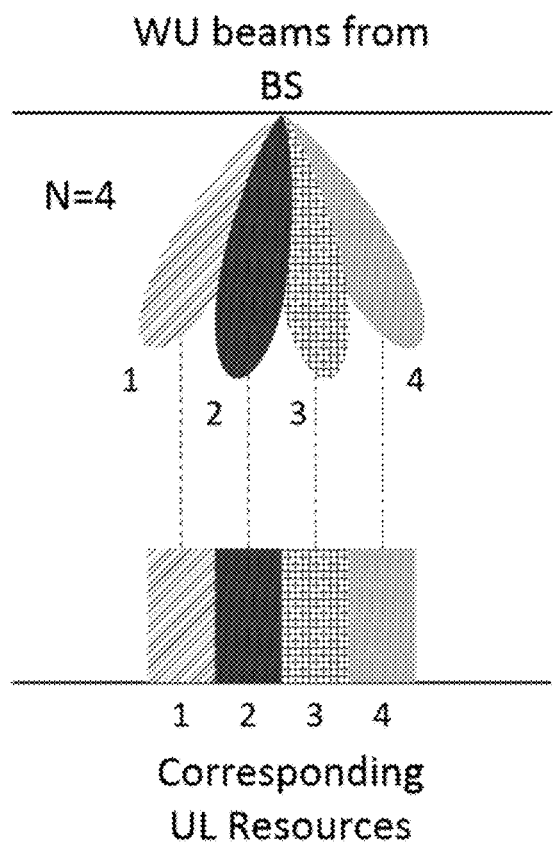
FIG. 2B is an example conceptual diagram of a mapping of uplink resources to each wake-up beam.

FIG. 2B is a conceptual diagram 250 of a mapping of uplink resources to each wake-up beam from a set of wake-up beams 152. In particular, each wake-up beam from the set of wake-up beams 152 may have an associated uplink resource. In some aspects, the uplink resource may correspond to a time-frequency resource on which the UE 110 may send a distress indication 156. For instance, the uplink resource may correspond to a physical uplink control channel (PUCCH) resource (e.g., distress indication 156 may be a PUCCH message), an sounding reference signal (SRS) resource, and/or a random access channel (RACH) resource. However, the precise uplink resource that the UE 110 transmits the distress indication 156 may be mapped to a healthy wake-up beam (e.g., quality over a threshold). That is, the UE 110 may transmit the distress indication 156 on at least one uplink resource associated with a wake-up beam that satisfies the quality threshold. In some aspects, if there are more than one healthy wake-up beams, the UE 110 may send the distress indication 156 on multiple uplink resources (e.g., each uplink resource associated with a healthy wake-up beam). Additionally, the distress indication may contain information about the failed wake-up beams. In some aspects, the base station 105 may detect the failed beams from the resources on which the distress indication 156 is received from the UE 110.

Figure 3:
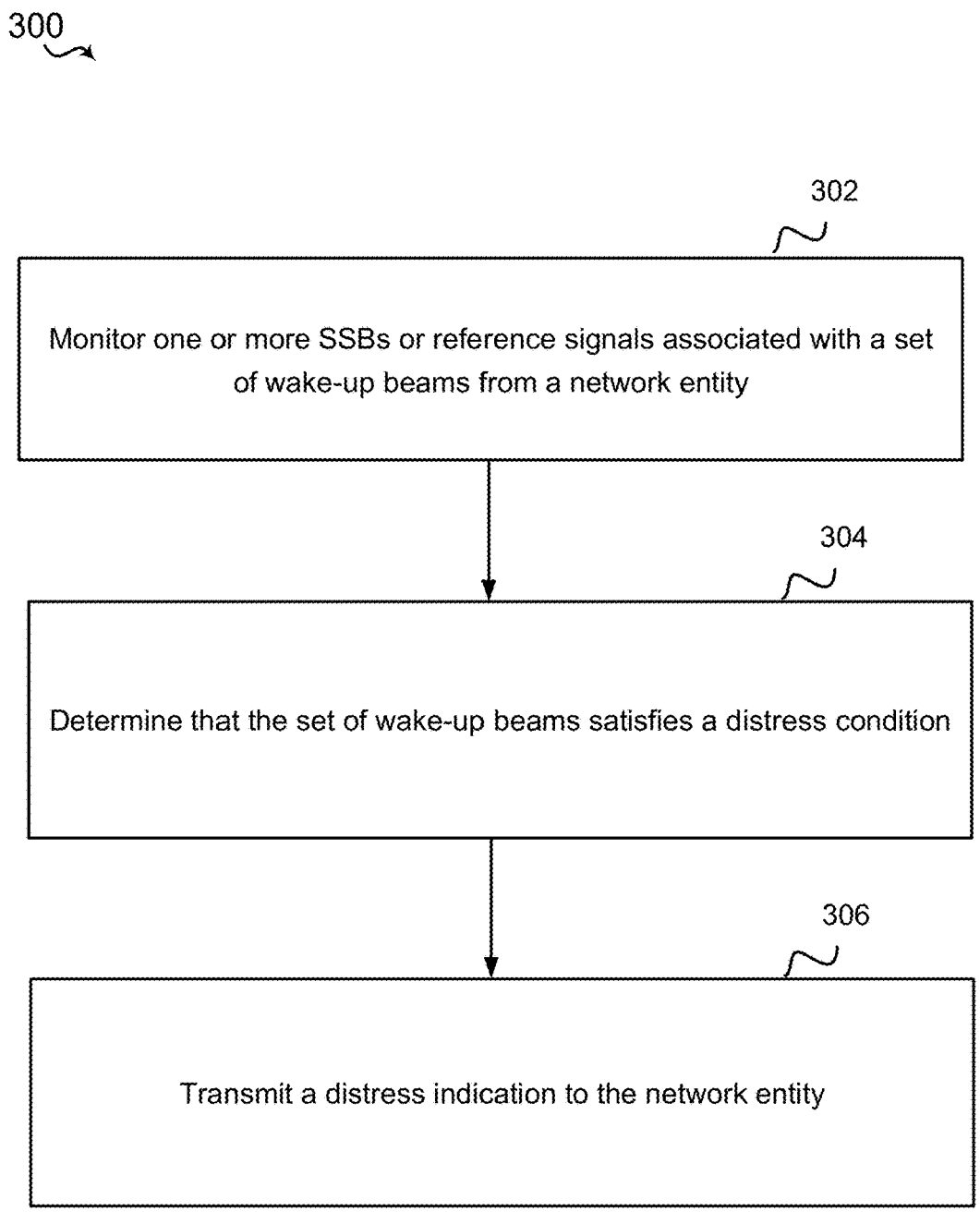
FIG. 3 is a flow diagram of an example of a method of wireless communication at a UE.

Referring to FIG. 3, for example, a method 200 of wireless communication in operating a UE such as UE 110 according to the aspects described herein to proactively manage wake-up beams during C-DRX operation according to one or more of the herein-defined actions.

At block 302, the method 300 may monitor one or more SSBs or reference signals associated with a set of wake-up beams from a network entity. For example, as described herein, the modem 140 of the UE 110 may execute wake-up beam management component 150 to monitor one or more SSBs or reference signals for or associated with a set of wake-up beams 152 from a network entity (e.g., base station 105).

In some aspects, monitoring the one or more SSBs or reference signals may include monitoring during a C-DRX OFF period.

In some aspects, the one or more SSBs or reference signals are QCLed with the set of wake-up beams 152.

At block 304, the method 300 may determine that the set of wake-up beams satisfies a distress condition. For example, as described herein, the modem 140 of the UE 110 may execute wake-up beam management component 150 to determine that the set of wake-up beams 152 satisfies a distress condition 154.

In some aspects, determining that the set of wake-up beams 152 satisfies the distress condition 154 may include determining that a number of wake-up beams from the set of wake-up beams 152 fails to satisfy a quality threshold representing a sufficient beam quality for wake-up indication communication. In some aspects, transmitting the distress indication 156 may include transmitting the distress indication 156 based on determining that the number of wake-up beams from the set of wake-up beams 152 fail to satisfy the quality threshold.

In some aspects, determining that the number of wake-up beams from the set of wake-up beams 152 fail to satisfy the quality threshold may include at least one of determining that the number of wake-up beams from the set of wake-up beams 152 fail to satisfy the quality threshold a number of consecutive times, or determining that the number of wake-up beams from the set of wake-up beams 152 fail to satisfy the quality threshold within a period of time.

In some aspects, determining that the number of wake-up beams from the set of wake-up beams 152 fails to satisfy a quality threshold may include determining that each wake-up beam from the set of wake-up beams 152 fails to satisfy the quality threshold. Although not shown, the method 300 may further detect a radio link failure based on determining that each wake-up beam from the set of wake-up beams 152 fails to satisfy the quality threshold and perform an initial access procedure to reestablish an RRC connection with the network entity (e.g., base station 105).

At block 306, the method 300 may transmit a distress indication to the network entity. For example, as described herein, the modem 140 of the UE 110 may execute wake-up beam management component 150 to transmit a distress indication 156 to the network entity (e.g., base station 105).

In some aspects, each wake-up beam from the set of wake-up beams 152 may be associated with an uplink resource. In some aspects, transmitting the distress indication 156 may include transmitting the distress indication 156 on at least one uplink resource associated with a wake-up beam from the set of wake-up beams 152 that satisfies the quality threshold.

In some aspects, the distress indication 156 may include information on the number of wake-up beams from the set of wake-up beams 152 that fail to satisfy the quality threshold.

In some aspects, transmitting the distress indication 156 may include transmitting the distress indication 156 at a subsequent C-DRX ON duration.

In some aspects, the distress indication 156 may trigger a transmission of a subsequent set of wake-up beams 158 from the network entity (e.g., base station 105), the subsequent set of wake-up beams 156 including at least one wake-up beams not included in the set of wake-up beams 152.

In some aspects, although not show, the method 300 may monitor the one or more SSBs or reference signals for or associated with the subsequent set of wake-up beams 158 from the network entity (e.g., base station 105) in response to transmitting the distress indication 156.

Figure 4:
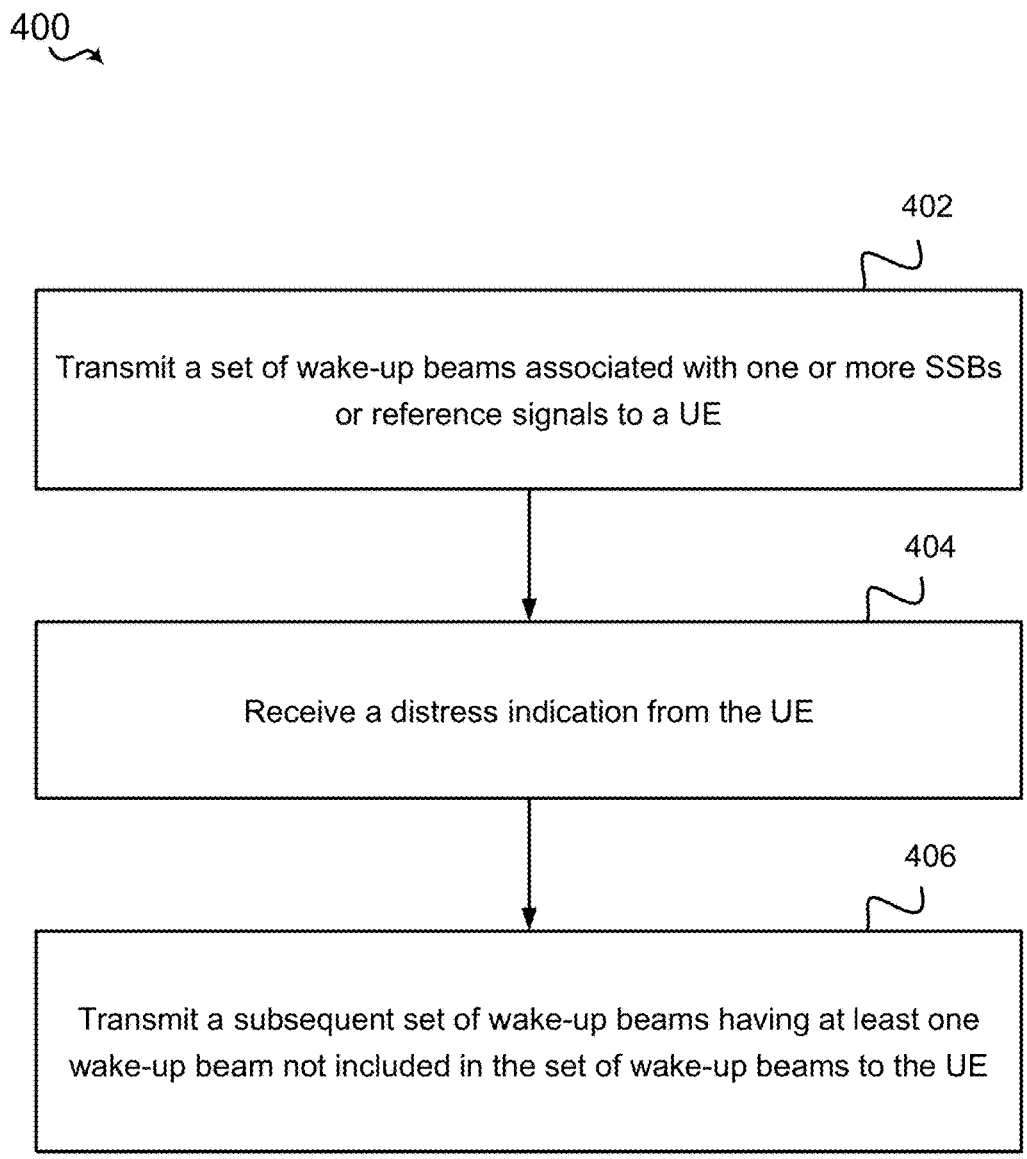
FIG. 4 is a flow diagram of another example of a method of wireless communication at a network entity.

Referring to FIG. 4, for example, a method 300 of wireless communication in operating a network entity such as base station 105 according to the aspects described herein to communicate with a UE proactively managing wake-up beams according to one or more of the herein-defined actions.

At block 402, the method 300 may transmit a set of wake-up beams associated with one or more SSBs or reference signals to a UE. For example, as described herein, the base station 105 may execute a transceiver 502 and/or RF front end 588 to transmit a set of wake-up beams 152 associated with one or more SSBs or reference signals to a UE 110.

At block 404, the method 300 may receive a distress indication from the UE. For example, as described herein, the base station 105 may execute a transceiver 502 and/or RF front end 588 to receive a distress indication 156 from the UE 110.

In some aspects, the distress indication 156 may include information on a number of wake-up beams from the set of wake-up beams 152 that fail to satisfy a quality threshold representing a sufficient beam quality for wake-up indication communication.

At block 406, the method 300 may transmit a subsequent set of wake-up beams having at least one wake-up beam not included in the set of wake-up beams to the UE. For example, as described herein, the base station 105 may execute a transceiver 502 and/or RF front end 588 to transmit a subsequent set of wake-up beams 158 having at least one wake-up beam not included in the set of wake-up beams 152 to the UE 110.

Although not shown, the method 300 may determine at least one wake-up beam that fails to satisfy a quality threshold based at least on an uplink resource used to receive the distress indication from the UE 110.

Although not shown, the method 300 may perform a partial beam recovery procedure in response to receiving the distress indication 156.

Figure 5:
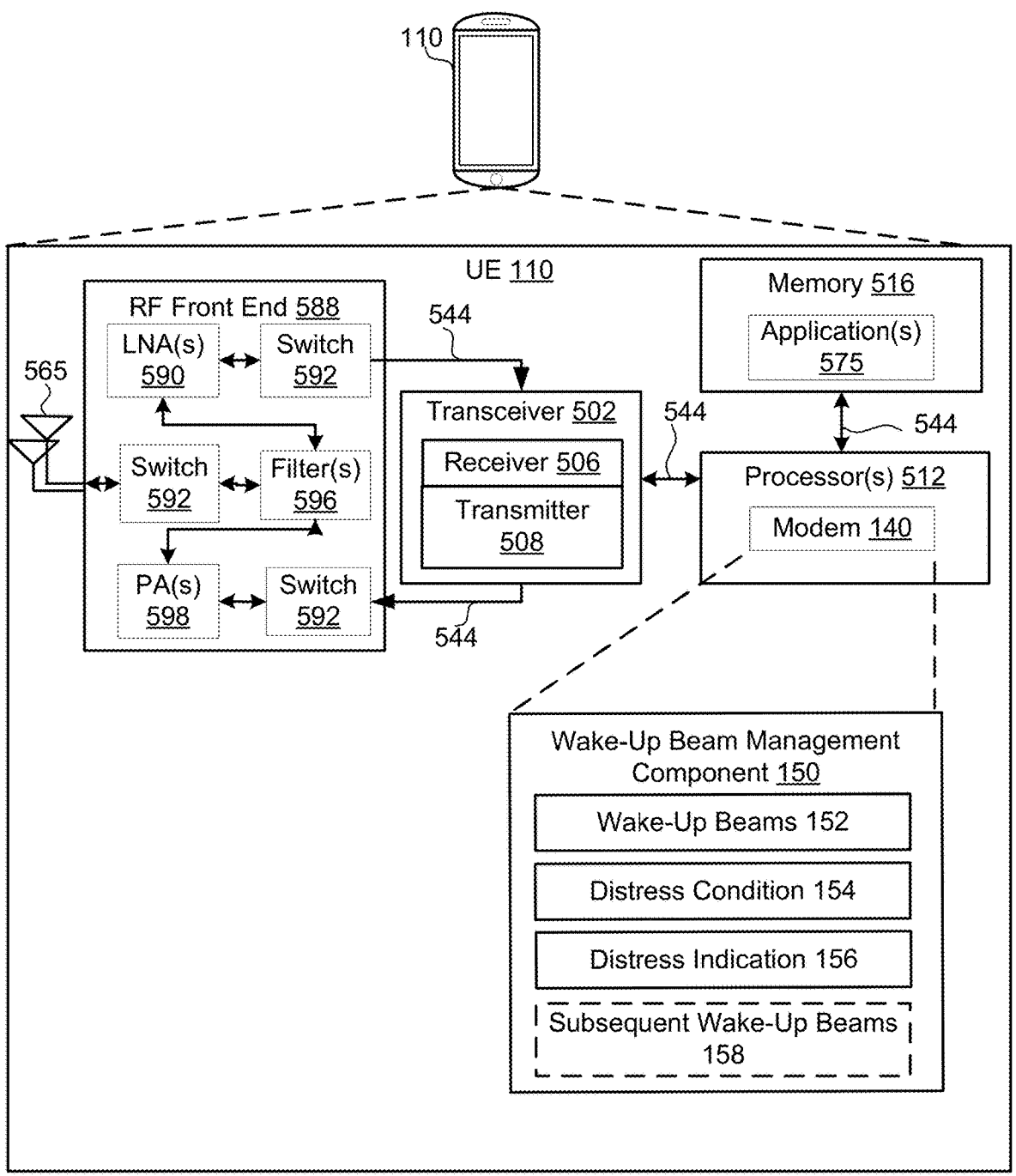
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and wake-up beam management component 150 as described herein. Further, the one or more processors 512, modem 140, memory 516, transceiver 502, radio frequency (RF) front end 588 and one or more antennas 565, may be configured to support voice and/or data calls (simultaneously or non-simultaneously) in one or more radio access technologies. In some aspects, the modem 140 may be the same as or similar to the modem 140.

In an aspect, the one or more processors 512 can include a modem 140 that uses one or more modem processors. The various functions related to wake-up beam management component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with wake-up beam management component 150 may be performed by transceiver 502.

Also, memory 516 may be configured to store data used herein and/or local versions of applications 575 or wake-up beam management component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining wake-up beam management component 150 and/or one or more of its subcomponents, and/or data associated therewith, when UE 110 is operating at least one processor 512 to execute wake-up beam management component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. The RF front end 588 may be communicatively couples with one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 502 to operate at a specified frequency and power level based on the UE configuration of the UE 110 and the communication protocol used by the modem 140.

In an aspect, the modem 140 can be a multiband-multimode modem, which can process digital data and communicate with transceiver 502 such that the digital data is sent and received using transceiver 502. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 6:
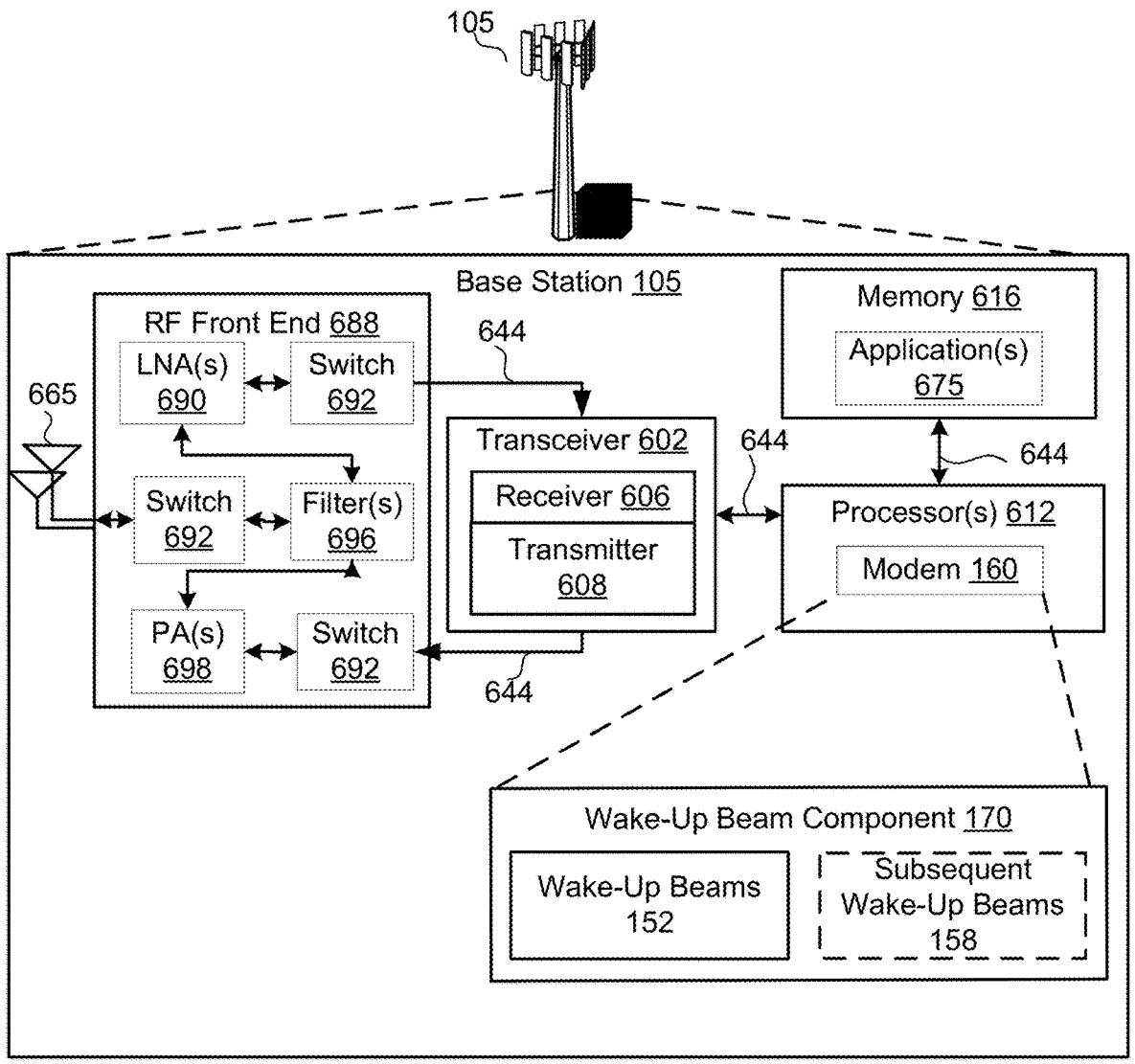
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and wake-up beam component 170 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

SOME FURTHER EXAMPLE EMBODIMENTS

An example method of wireless communications at a user equipment, comprising: monitoring one or more synchronization signal blocks (SSBs) or reference signals associated with a set of wake-up beams from a network entity; determining that the set of wake-up beams satisfies a distress condition; and transmitting a distress indication to the network entity based on determining that the set of wake-up beams satisfies the distress condition.

The above example method, wherein determining that the set of wake-up beams satisfies the distress condition includes: determining that a number of wake-up beams from the set of wake-up beams fails to satisfy a quality threshold representing a sufficient beam quality for wake-up indication communication, and wherein transmitting the distress indication includes transmitting the distress indication based on determining that the number of wake-up beams from the set of wake-up beams fails to satisfy the quality threshold.

One or more of the above example methods, wherein each wake-up beam from the set of wake-up beams is associated with an uplink resource, and wherein transmitting the distress indication includes transmitting the distress indication on at least one uplink resource associated with a wake-up beam from the set of wake-up beams that satisfies the quality threshold.

One or more of the above example methods, wherein determining that the number of wake-up beams from the set of wake-up beams fails to satisfy the quality threshold includes at least one of: determining that the number of wake-up beams from the set of wake-up beams fails to satisfy the quality threshold a number of consecutive times, or determining that the number of wake-up beams from the set of wake-up beams fails to satisfy the quality threshold within a period of time.

One or more of the above example methods, wherein determining that the number of wake-up beams from the set of wake-up beams fails to satisfy a quality threshold includes determining that each wake-up beam from the set of wake-up beams fails to satisfy the quality threshold, the method further comprising: detecting a radio link failure based on determining that each wake-up beam from the set of wake-up beams fails to satisfy the quality threshold; and performing an initial access procedure to reestablish a radio resource control (RRC) connection with the network entity.

One or more of the above example methods, wherein the distress indication includes information on the number of wake-up beams from the set of wake-up beams that fail to satisfy the quality threshold.

One or more of the above example methods, wherein monitoring the one or more SSBs or reference signals includes monitoring during a connected mode discontinuous reception (C-DRX) OFF period.

One or more of the above example methods, wherein transmitting the distress indication includes transmitting the distress indication at a subsequent C-DRX ON duration.

One or more of the above example methods, wherein the distress indication triggers a transmission of a subsequent set of wake-up beams from the network entity, the subsequent set of wake-up beams including at least one wake-up beam not included in the set of wake-up beams.

One or more of the above example methods, further comprising monitoring the one or more SSBs or reference signals associated with the subsequent set of wake-up beams from the network entity in response to transmitting the distress indication.

One or more of the above example methods, wherein the one or more SSBs or reference signals are quasi co-located (QCL) with the set of wake-up beams.

An example method of wireless communication at a network entity, comprising: transmitting a set of wake-up beams associated with one or more synchronization signal blocks (SSBs) or reference signals to a user equipment (UE); receiving a distress indication from the UE in response to transmitting the set of wake-up beams; and transmitting a subsequent set of wake-up beams having at least one wake-up beam not included in the set of wake-up beams to the UE.

The above example method, wherein the distress indication includes information on a number of wake-up beams from the set of wake-up beams that fail to satisfy a quality threshold representing a sufficient beam quality for wake-up indication communication.

One or more of the above example methods, further comprising determining at least one wake-up beam that fails to satisfy a quality threshold based at least on an uplink resource used to receive the distress indication from the UE.

One or more of the above example methods, further comprising performing a partial beam recovery procedure in response to receiving the distress indication.

An example user equipment (UE), comprising: a memory; and at least one processor in communication with the memory, wherein the processor is configured to: monitor one or more synchronization signal blocks (SSBs) or reference signals associated with a set of wake-up beams from a network entity; determine that the set of wake-up beams satisfies a distress condition; and transmit a distress indication to the network entity based on determining that the set of wake-up beams satisfies the distress condition.

The above example UE, wherein to determine that the set of wake-up beams satisfies the distress condition, the at least one processor is further configured to: determine that a number of wake-up beams from the set of wake-up beams fails to satisfy a quality threshold representing a sufficient beam quality for wake-up indication communication, and wherein to transmit the distress indication, the at least one processor is further configured to transmitting the distress indication based on determining that the number of wake-up beams from the set of wake-up beams fails to satisfy the quality threshold.

One or more of the above example UE, wherein each wake-up beam from the set of wake-up beams is associated with an uplink resource, and wherein to transmit the distress indication, the at least one processor is further configured to transmitting the distress indication on at least one uplink resource associated with a wake-up beam from the set of wake-up beams that satisfies the quality threshold.

One or more of the above example UE, wherein to determine that the number of wake-up beams from the set of wake-up beams fails to satisfy the quality threshold, the at least one processor is further configured to: determine that the number of wake-up beams from the set of wake-up beams fails to satisfy the quality threshold a number of consecutive times, or determine that the number of wake-up beams from the set of wake-up beams fails to satisfy the quality threshold within a period of time.

One or more of the above example UE, wherein to determine that the number of wake-up beams from the set of wake-up beams fails to satisfy a quality threshold, the at least one processor is further configured to determine that each wake-up beam from the set of wake-up beams fails to satisfy the quality threshold, the at least one processor is further configured to: detect a radio link failure based on determining that each wake-up beam from the set of wake-up beams fails to satisfy the quality threshold; and perform an initial access procedure to reestablish a radio resource control (RRC) connection with the network entity.

One or more of the above example UE, wherein the distress indication includes information on the number of wake-up beams from the set of wake-up beams that fail to satisfy the quality threshold.

One or more of the above example UE, wherein to monitor the one or more SSBs or reference signals, the at least one processor is further configured to monitor during a connected mode discontinuous reception (C-DRX) OFF period.

One or more of the above example UE, wherein to transmit the distress indication, the at least one processor is further configured to transmit the distress indication at a subsequent C-DRX ON duration.

One or more of the above example UE, wherein the distress indication triggers a transmission of a subsequent set of wake-up beams from the network entity, the subsequent set of wake-up beams including at least one wake-up beam not included in the set of wake-up beams.

One or more of the above example UE, wherein the at least one processor is further configured to monitor the one or more SSBs or reference signals associated with the subsequent set of wake-up beams from the network entity in response to transmitting the distress indication.

One or more of the above example UE, wherein the one or more SSBs or reference signals are quasi co-located (QCL) with the set of wake-up beams.

An example network entity, comprising: a memory; and at least one processor in communication with the memory, wherein the processor is configured to: transmit a set of wake-up beams associated with one or more synchronization signal blocks (SSBs) or reference signals to a user equipment (UE); receive a distress indication from the UE in response to transmitting the set of wake-up beams; and transmit a subsequent set of wake-up beams having at least one wake-up beam not included in the set of wake-up beams to the UE.

The above example network entity, wherein the distress indication includes information on a number of wake-up beams from the set of wake-up beams that fail to satisfy a quality threshold representing a sufficient beam quality for wake-up indication communication.

One or more of the above example network entity, wherein the at least one processor is further configured to determine at least one wake-up beam that fails to satisfy a quality threshold based at least on an uplink resource used to receive the distress indication from the UE.

One or more of the above example network entity, wherein the at least one processor is further configured to perform a partial beam recovery procedure in response to receiving the distress indication.

An example apparatus for wireless communications, comprising: means for monitoring one or more synchronization signal blocks (SSBs) or reference signals associated with a set of wake-up beams from a network entity; means for determining that the set of wake-up beams satisfies a distress condition; and means for transmitting a distress indication to the network entity based on determining that the set of wake-up beams satisfies the distress condition.

An example non-transitory computer-readable medium storing computer code executable by a processor for wireless communications at a UE including code for monitoring one or more synchronization signal blocks (SSBs) or reference signals associated with a set of wake-up beams from a network entity; code for determining that the set of wake-up beams satisfies a distress condition; and code for transmitting a distress indication to the network entity based on determining that the set of wake-up beams satisfies the distress condition.

An example apparatus for wireless communication, comprising: means for transmitting a set of wake-up beams associated with one or more synchronization signal blocks (SSBs) or reference signals to a user equipment (UE); means for receiving a distress indication from the UE in response to transmitting the set of wake-up beams; and means for transmitting a subsequent set of wake-up beams having at least one wake-up beam not included in the set of wake-up beams to the UE.

An example non-transitory computer-readable medium storing computer code executable by a processor for wireless communications at a UE including code for transmitting a set of wake-up beams associated with one or more synchronization signal blocks (SSBs) or reference signals to a user equipment (UE); code for receiving a distress indication from the UE in response to transmitting the set of wake-up beams; and code for transmitting a subsequent set of wake-up beams having at least one wake-up beam not included in the set of wake-up beams to the UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment, comprising:
    monitoring one or more synchronization signal blocks (SSBs) or reference signals associated with a set of wake-up beams from a network entity during a connected mode discontinuous reception (C-DRX) OFF period;
    determining, during the C-DRX OFF period, that the set of wake-up beams satisfies a distress condition;

waking up, at a subsequent C-DRX ON duration, in response to determining that the set of wake-up beams satisfies the distress condition;

transmitting, after the waking up, a distress indication to the network entity, during the subsequent C-DRX ON duration, in response to determining that the set of wake-up beams satisfies the distress condition; and transitioning from a C-DRX ON state to a C-DRX OFF state after transmitting the distress indication to the network entity, wherein transitioning from the C-DRX ON state to the C-DRX OFF state comprises:

transitioning to the C-DRX OFF state after remaining on until the end of the subsequent C-DRX ON duration of a C-DRX cycle in response to determining a wake-up signal is received from the network entity during the C-DRX OFF period.

2. The method of claim 1, wherein determining that the set of wake-up beams satisfies the distress condition includes:

determining that a number of wake-up beams from the set of wake-up beams fails to satisfy a quality threshold representing a sufficient beam quality for wake-up indication communication, and wherein transmitting the distress indication includes transmitting the distress indication based on determining that the number of wake-up beams from the set of wake-up beams fails to satisfy the quality threshold.

3. The method of claim 2, wherein each wake-up beam from the set of wake-up beams is associated with an uplink resource, and wherein transmitting the distress indication includes transmitting the distress indication on at least one uplink resource associated with a wake-up beam from the set of wake-up beams that satisfies the quality threshold.

4. The method of claim 2, wherein determining that the number of wake-up beams from the set of wake-up beams fails to satisfy the quality threshold includes at least one of:

determining that the number of wake-up beams from the set of wake-up beams fails to satisfy the quality threshold a number of consecutive times, or determining that the number of wake-up beams from the set of wake-up beams fails to satisfy the quality threshold within a period of time.

5. The method of claim 2, wherein determining that the number of wake-up beams from the set of wake-up beams fails to satisfy a quality threshold includes determining that each wake-up beam from the set of wake-up beams fails to satisfy the quality threshold, the method further comprising:

detecting a radio link failure based on determining that each wake-up beam from the set of wake-up beams fails to satisfy the quality threshold; and performing an initial access procedure to reestablish a radio resource control (RRC) connection with the network entity.

6. The method of claim 2, wherein the distress indication includes information on the number of wake-up beams from the set of wake-up beams that fail to satisfy the quality threshold.

7. The method of claim 1, further comprising receiving the wake-up signal from the network entity after determining the distress condition and before transmitting the distress indication.

8. The method of claim 1, wherein transmitting the distress indication includes transmitting the distress indication to the network entity at the subsequent C-DRX ON duration even if the wake-up signal from the network entity is not received after determining the distress condition.

9. The method of claim 1, wherein the distress indication triggers a transmission of a subsequent set of wake-up beams from the network entity, the subsequent set of wake-up beams including at least one wake-up beam not included in the set of wake-up beams.

10. The method of claim 9, further comprising monitoring the one or more SSBs or reference signals associated with the subsequent set of wake-up beams from the network entity in response to transmitting the distress indication.

11. The method of claim 1, wherein the one or more SSBs or reference signals are quasi co-located (QCL) with the set of wake-up beams.

12. A user equipment (UE), comprising:

a memory; and at least one processor in communication with the memory, wherein the processor is configured to:

monitor one or more synchronization signal blocks (SSBs) or reference signals associated with a set of wake-up beams from a network entity during a connected mode discontinuous reception (C-DRX) OFF period;

determine, during the C-DRX OFF period, that the set of wake-up beams satisfies a distress condition;

wake up, at a subsequent C-DRX ON duration, in response to determining that the set of wake-up beams satisfies the distress condition;

transmit, after the waking up, a distress indication to the network entity, during the subsequent C-DRX ON duration, in response to determining that the set of wake-up beams satisfies the distress condition; and transition from a C-DRX ON state to a C-DRX OFF state after transmitting the distress indication to the network entity, wherein to transition from the C-DRX ON state to the C-DRX OFF state, the at least one processor is further configured to:

transition to the C-DRX OFF state after remaining on until the end of the subsequent C-DRX ON duration of a C-DRX cycle in response to determining a wake-up signal is received from the network entity during the C-DRX OFF period.

13. The UE of claim 12, wherein to determine that the set of wake-up beams satisfies the distress condition, the at least one processor is further configured to:

determine that a number of wake-up beams from the set of wake-up beams fails to satisfy a quality threshold representing a sufficient beam quality for wake-up indication communication, and wherein to transmit the distress indication, the at least one processor is further configured to transmitting the distress indication based on determining that the number of wake-up beams from the set of wake-up beams fails to satisfy the quality threshold.

14. The UE of claim 13, wherein each wake-up beam from the set of wake-up beams is associated with an uplink resource, and wherein to transmit the distress indication, the at least one processor is further configured to transmit the distress indication on at least one uplink resource associated with a wake-up beam from the set of wake-up beams that satisfies the quality threshold.

15. The UE of claim 13, wherein to determine that the number of wake-up beams from the set of wake-up beams fails to satisfy the quality threshold, the at least one processor is further configured to:

determine that the number of wake-up beams from the set of wake-up beams fails to satisfy the quality threshold a number of consecutive times, or determine that the number of wake-up beams from the set of wake-up beams fails to satisfy the quality threshold within a period of time.

16. The UE of claim 13, wherein to determine that the number of wake-up beams from the set of wake-up beams fails to satisfy a quality threshold, the at least one processor is further configured to determine that each wake-up beam from the set of wake-up beams fails to satisfy the quality threshold, the at least one processor is further configured to:
  detect a radio link failure based on determining that each wake-up beam from the set of wake-up beams fails to satisfy the quality threshold; and
  perform an initial access procedure to reestablish a radio resource control (RRC) connection with the network entity.

17. The UE of claim 13, wherein the distress indication includes information on the number of wake-up beams from the set of wake-up beams that fail to satisfy the quality threshold.

18. The UE of claim 12, wherein the distress indication triggers a transmission of a subsequent set of wake-up beams from the network entity, the subsequent set of wake-up beams including at least one wake-up beam not included in the set of wake-up beams.

19. The UE of claim 18, wherein the at least one processor is further configured to monitor the one or more SSBs or reference signals associated with the subsequent set of wake-up beams from the network entity in response to transmitting the distress indication.

20. The UE of claim 12, wherein the one or more SSBs or reference signals are quasi co-located (QCL) with the set of wake-up beams.

21. The UE of claim 12, wherein the at least one processor is further configured to receive the wake-up signal from the network entity after the distress condition is determined and before the distress indication is transmitted.

22. The UE of claim 12, wherein the at least one processor is configured to transmit the distress indication to the network entity at the subsequent C-DRX ON duration even if the wake-up signal from the network entity is not received after the distress condition is determined.

* * * * *